United States Patent Office 3,346,554
Patented Oct. 10, 1967

3,346,554
PROCESS OF PREPARING SYMMETRICAL
AZO COMPOUNDS
Julius Jakob Fuchs, Wilmington, Del., assignor to E. I.
du Pont de Nemours and Company, Wilmington, Del.,
a corporation of Delaware
No Drawing. Filed Sept. 16, 1964, Ser. No. 397,022
1 Claim. (Cl. 260—192)

This invention relates to a process for the preparation of azo compounds. More particularly, this invention relates to a process for the preparation of symmetrical azo compounds of the following formula:

(1)
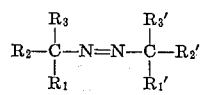

wherein $R_1'$ is the same as $R_1$, $R_2'$ is the same as $R_2$, and $R_3'$ is the same as $R_3$; and $R_1$ is alkyl of from 1 to 6 carbon atoms, $R_2$ is cycloalkyl of from 3 to 6 carbon atoms or alkyl of from 1 to 6 carbon atoms, $R_3$ is a radical selected from the group consisting of —CN, —COOR, and —COOM, where R is an alkyl radical of from 1 to 6 carbon atoms and M is sodium or potassium; provided that $R_1$ and $R_2$ can be taken together and are a cycloalkyl of from 4 to 12 carbon atoms, and with the limitation that $R_1$ and $R_2$ will total to more than 4 carbon atoms; said process comprising coupling the corresponding N-dichloro-amino compounds in the presence of an organic solvent and a strong base. This invention further relates to the N-dichloro-amino compounds used in the coupling process and to a process for their preparation.

The symmetrical azo compounds of formula (1) display exceptional utility as initiators for polymerization of olefins and can also be used as blowing agents in various foaming processes as will be further illustrated in the examples.

The preparation of azo compounds is known in the art, as disclosed, for example, in Anderson U.S. Patent No. 2,711,405 issued June 21, 1955; DeBenneville, U.S. Patent No. 2,713,576, issued July 19, 1955; and Hunt, U.S. Patent No. 2,471,959, issued May 31, 1949.

Although the process as disclosed in the Anderson patent is useful for the preparation of such azo-nitriles as the one prepared from acetone-aminonitrile, the coupling process as disclosed in Anderson results in extremely poor yields when applied to amino compounds of higher molecular weight such as those of this invention. Similarly, the DeBenneville patent discloses a process for the preparation of symmetrical azo compounds but specifically limits the compounds which can be made by that process so as to exclude those made by this invention because of attendant low yields when reactants of such a high molecular weight are employed.

Other processes for the preparation of azo compounds, such as the process disclosed in Hunt, have other apparent drawbacks. The Hunt process, for example, requires hydrazine or derivatives of hydrazine as a raw material which results in an extremely expensive product.

According to my discovery two molecules of an N-dichloro-amino compound of the following formula (2)
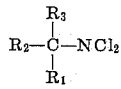

wherein $R_1$, $R_2$ and $R_3$ are as defined above in Formula 1, are coupled in the presence of an organic solvent and a strong base, at a temperature above the freezing point of the reactants and below the temperature at which occurs pronounced decomposition of the azo compound which is being formed. Surprisingly, this process results in yields of the azo compound in excess of 85% based on the amount of N-dichloro-amino compound used.

When the term alkyl or alkyl radical is used herein in referring to $R_1$, $R_2$, and $R_3$, it is meant to include substituted as well as unsubstituted alkyls. For example, such substituents as alkoxy of from 1 to 4 carbon atoms, carboxy, carbomethoxy, carboethoxy, phenyl, or from one to three chlorine substituents can be present on an alkyl without departing from the concept of this invention as is hereinafter illustrated in the examples.

REACTANTS

The N-dichloro-amino compounds suitable for use in this process can be prepared by the methods outlined hereinafter. The amount of such compounds used in the reaction will depend upon the particular reactants, but will normally range from about ½ to about 25% based on the total weight of reactor charge. In order to obtain the most efficient reaction a preferred amount of N-dichloro-amino compound to be used is from about 2 to about 15% based on the total weight of reactor charge.

The organic solvent to be used in this process will be selected according to the base which is to be used and the N-dichloro-amino compound to be coupled. If a base such as sodium or potassium hydroxide is to be used in a water solution the organic solvent will be selected from among those which are water miscible or partially miscible such as methanol, ethanol, propanol, isopropanol, normal butanol, secondary butanol, tertiary butanol, isoamyl alcohol, normal amyl alcohol, sec.-amyl alcohol, tert.-amyl alcohol, dioxane, dimethylformamide, dimethylacetamide, pyridine, tetrahydrofuran, and such ethers as diethyleneglycolmonoethylether, diethyleneglycoldiethylether, diethyleneglycolmonomethylether, and diethyleneglycoldimethylether.

However, the base can be one such as trimethylamine, triethylamine, tripropylamine, tributylamine or triethanolamine, which are generally soluble in organic solvents in which case the solvent need not be miscible with water but will be selected according to the solubility of the base. Suitable solvents for use with such bases as trimethylamine, triethylamine, triethanolamine and the like would be those such as benzene, pentane, hexane, heptane, cyclohexane, toluene, xylene, 1,1,1-trichloroethane, chloroform, carbon tetrachloride, and methylene dichloride.

Therefore, the criteria for selection of the organic solvent is its capacity to dissolve both the N-dichloro-amino compound and the base, and any organic solvent which meets this criteria is suitable.

The strong bases suitable for use in the coupling process are those which will not react with chlorine to form an N-chloro compound and which have an ionization constant greater than $1 \times 10^{-5}$. Such bases as sodium hydroxide, potassium hydroxide, trimethylamine, triethylamine, and triethanolamine are satisfactory.

The amount of base used will ordinarily be a slight excess over the stoichiometric amount necessary to react with the chlorine from the N-dichloro-amino compound liberated during the coupling reaction.

An optional variation on this process is to add some of a corresponding amino compound with the base. The amino-compound under such circumstances will couple with some of the N-dichloro-amino compound and thereby give a significant improvement in the overall chlorine yield of the process.

Up to ½ mole of amino compound can be added with the base for each mole of corresponding N-dichloro-amino compound being used in this modified coupling procedure.

REACTION CONDITIONS

The coupling reaction is very exothermic and to a large degree controls the rate of addition and the order of admixture of the reactants. The base, solvent, and N-dichloro-amino compound used can be admixed in any order so long as the base and N-dichloro-amino compound are not mixed in the absence of a solvent. If the latter order of addition is followed the reaction can be exceedingly violent. The rate of addition can be as fast as cooling equipment and maximum temperature will permit. The reaction can be carried out in any suitable reaction vessel which is equipped for agitation and cooling.

The lower limit on the temperature of the coupling reaction will vary according to the reactants, with the lowest operating temperature of necessity being above the freezing point of the mixture. Similarly, the maximum temperature will also depend upon the reactants and the product being formed and must be below the boiling point of the reactants and below the temperature at which occurs pronounced decomposition of the azo compound being formed. The temperature generally will be kept above $-10°$ C. and below about 60° C. and for convenience and economy will most preferably be kept at about room temperature.

Recovery of the azo compound can be by conventional means. Ordinarily the crystalline azo compound can be recovered as by filtration. Optionally, if the reaction was conducted in the absence of water, water can be added to remove water soluble impurities such as salts, prior to recovery of the azo compound from the solvent. Distillation of the solvent and other such methods well known in the art are appropriate also.

PREPARATION OF THE N-DICHLORO-AMINO COMPOUNDS

The N-dichloro-amino compound to be used in the coupling process can be prepared by one of the following methods: (1) an amino compound corresponding to the N-di-chloro-amino compound sought to be prepared, can be reacted with chlorine in the presence of an acid acceptor and water while maintaining the pH of the reaction system at approximately neutral; (2) an amino compound can be chlorinated in the presence of water and a water immiscible organic solvent at a pH of about neutral; and (3) an amino compound can be reacted with chlorine in an organic solvent in the absence of water at about a neutral pH.

Such a reaction as (1) above can be conducted at temperatures ranging from above the freezing point of the reaction mixture to below its boiling point. Preferably, the temperature will range from about $-10°$ C. to $+10°$ C. for maximum reaction efficiency.

The amount of chlorine used will be in excess of 2 moles of chlorine per mole of amino compound. The chlorine can be added over any time period but will preferably be added over a period of about 30 minutes so as to prevent rapid formation of by-product hydrochloric acid in the reaction system. Prevention of such by-product HCl aids in avoiding a low pH which would tend to cause decomposition of the N-dichloro-amino compound being formed.

The amino compound will have a formula of (3)

wherein $R_1$, $R_2$, and $R_3$ are the same as previously described for Formulas 1 and 2.

The amount of amino compound used can range from about 1 to about 25% by weight of the water. Preferably the amount used will range from about 2 to about 15% by weight in order to achieve maximum reaction efficiency.

The acid acceptor can be any of the alkali metal or alkaline earth metal bases such as potassium hydroxide, sodium hydroxide, sodium carbonate, potassium carbonate, sodium bicarbonate and potassium bicarbonate. The acid acceptor will be added at a rate slightly in excess of that needed to neutralize the hydrochloric acid being formed, thereby maintaining an approximately neutral pH or a very slightly basic solution. Care must be taken to avoid a large excess of acid acceptor because as mentioned previously the attendant high pH will tend to cause decomposition of the N-dichloro-amino compound being formed.

The reaction can be carried out in any suitable reaction vessel, preferably one equipped with means for agitating the contents.

At conclusion of the reaction the normally liquid N-dichloro-amino compound can be separated from the salt and impurity rich water solution by decantation. Subsequent washing of the product can reduce the quantity of impurities trapped therein.

The second method of preparing the N-dichloro-amino compounds is by chlorinating the amino compound of Formula 3 in the presence of water, a water immiscible organic solvent, and an acid acceptor such as those used in method (1), under conditions similar to those just described.

The advantage gained from the use of the water immiscible organic solvent is the effect of extracting the N-dichloro-amino compound from the aqueous phase into the organic phase as it is formed, thereby minimizing the product's contact with the basic acid acceptor or the by-product acid.

The organic solvents suitable for such use are methylene dichloride, carbon tetrachloride, chloroform, benzene, dichlorobenzene, trichloroethane, and other such solvents which would not enter into the reaction.

The amount of organic solvent used is determined by the solubility of the product in the solvent to be used. Sufficient solvent is required to put the N-dichloro-amino compound in solution and remove it from the reaction medium. Preferably, sufficient solvent will be used so that 99% by weight of the product is dissolved in the organic solvent and no more than 1% is left in the aqueous phase.

The reaction conditions and equipment used will be the same as in the first method of preparing the N-dichloro-amino compounds. However, better agitation is required to maintain sufficient mixture of the phases.

The product can be recovered from the organic solvent, after the solvent's routine separation from the water phase, by stripping the solvent off of the product through simple concentration procedures, either atmospheric or vacuum.

The third means of preparing the N-dichloro-amino compound is by chlorinating an amino compound in an organic solvent in the absence of water under conditions similar to those of the two preceding methods.

The organic solvents suitable for use in this preparation are, for example, benzene, methylene chloride, carbon tetrachloride, chloroform, trichloroethylene, dichlorobenzene, methanol, and others.

The bases suitable for use in this preparation are weaker bases than those used in the two preceding preparations, generally those having an ionization constant of from $1 \times 10^{-5}$ to $1 \times 10^{-10}$ are acceptable. Since there is a more intimate contact between the base and the N-dichloro-amino compound being formed, the weaker base is necessary to avoid decomposition of the product upon contact with the base. Such bases as sodium carbonate, sodium bicarbonate, and calcium carbonate are particularly satisfactory.

The base is suspended in the organic solvent as a solid and is used in amounts comparable to the amounts used of the stronger bases in the two preceding preparations.

The reaction conditions and equipment will be similar to those of the immediately preceding preparation and here, as there, a high degree of agitation is required in order to maintain suspension of the solid base in the solvent.

The N-dichloro-amino compound which is formed can be recovered by separating the impurities and salts such as by water extraction and then stripping off the solvent from the product.

The N-dichloro-amino compounds prepared by any of the three preceding methods can be used in the coupling process for preparing a symmetrical azo compound as explained previously. The preferred N-dichloro-amino compounds, because of the exceptional utility of the corresponding symmetrical azo compounds, are those in which the $R_3$ group is C≡N.

In order that the invention can be better understood, the following illustrative examples are given, wherein parts are by weight unless otherwise noted.

Example 1

A solution of 62 parts cyclohexanone aminonitrile in 335 parts methylenechloride is agitated at 0° C. with 80 parts of 50% potassium carbonate for 15 minutes. To this reaction mixture is then added 35.5 parts chlorine gas at 0-5° C. with good agitation. The lower layer of the reaction mixture is separated, dried with calcium chloride and the methylenechloride evaporated under vacuum. There remains 94.3 parts of yellow N,N-dichlorocyclohexanone-aminonitrile of 98.15% purity (as indicated by liberation of iodine), which represents a 96% yield.

Example 2

To a solution of 63.2 parts of methylisobutyl-aminonitrile in 350 parts methylenechloride is added 80 parts 50% sodium hydroxide. Seventy-one parts chlorine gas is then introduced with good agitation at 0-5° C. After addition of water to dissolve the precipitated sodium chloride, the lower layer of the mixture is separated, dried with calcium chloride and the solvent evaporated under reduced pressure. The N,N-dichloro-methylisobutyl-aminonitrile is obtained as heavy, yellow, oily residue.

Example 3

To a solution of 56.1 parts diethylketone-amino-nitrile in 400 parts water are added 95 parts sodium bicarbonate. Seventy-one parts chlorine gas are then introduced with agitation at a temperature of 0-5° C. The N,N-dichloro-diethylketone-aminonitrile, which separates as a heavy, yellow oil is separated, washed with water, and dried with calcium chloride.

Example 4

To a solution of 69.2 parts 2-methylcyclohexanone-aminonitrile in 500 parts water are added 71 parts chlorine gas and 80 parts 50% sodium hydroxide solution at 0-5° C. at such a rate as to keep the pH of the reaction mixture between 7-12. The resulting N,N-dichloro-2-methyl-cyclohexanone-aminonitrile, a heavy yellow oil, is separated, washed with water, and dried with calcium chloride.

Example 5

To a solution of 78 parts 2,4-dimethyl-2-amino-4-methoxyvaleronitrile in 400 parts methanol are added 113 parts potassium bicarbonate. To this mixture is added 71 parts chlorine gas with good agitation at 0-5° C. The reaction product is filtered and contains the N,N-dichloro-2,4-dimethyl-2-amino-4-methoxy-valeronitrile in the filtrate, from which it can be isolated by evaporation of the methanol under reduced pressure. However, in this instance, the N,N-dichloro product is coupled to the corresponding azo compound prior to the evaporation by the addition of potassium hydroxide to the filtrate, as shown in Example 10.

Example 6

To a solution of 1.76 parts of 50% sodium hydroxide in 20 parts methanol is added with agitation 1.97 parts of N,N-dichloro-cyclohexanone-aminonitrile from Example 1. The addition is made at −10 to 10° C. and stirring is continued at this temperature for 30 minutes. After dilution with water there is obtained 1.01 parts of azo-bis(cyclohexanecarbonitrile) corresponding to a 83% yield.

Example 7

To a solution of 18.1 parts of N,N-dichloro-diethylketone-aminonitrile in 250 parts dioxane is gradually added at 3-5° C. with agitation 16 parts of 50% sodium hydroxide solution. The resulting reaction mixture is stirred for an additional 30 minutes without further cooling, diluted with water, and the precipitated azo-bis(α-ethylbutyronitrile) is isolated by filtration in 85% yield.

Example 8

A methylenechloride solution of N-dichloro-cyclohexanone-aminonitrile is prepared according to Example 1. To this solution is added at 0°-10° C. slowly a gas stream of trimethylamine until the coupling reaction is completed as indicated by loss of heat of reaction. Water is added and the methylenechloride evaporated under vacuum. The resulting solids are isolated by filtration and recrystallized from methanol to give azo-bis(cyclohexanecarbonitrile).

Example 9

To a solution of 19.3 parts of N,N-dichloro-cyclohexanone-aminonitrile and 6.2 parts of cyclohexanone-aminonitrile in 200 parts methanol is gradually added with agitation at −10 to 0° C. 17.6 parts 50% sodium hydroxide solution. After the addition is completed, the reaction mixture is stirred without further cooling for 20 minutes. Two hundred and fifty parts of water are then added and the precipitated azo-bis(cyclohexanecarbonitrile) isolated by filtration in 80% yield.

Example 10

To the filtrate obtained, as shown in Example 5, is gradually added with agitation at 0-5° C. 112 parts of 50% potassium hydroxide. The resulting reaction mixture is stirred for an additional 15 minutes without further cooling. After the addition of water, the precipitated azo-bis(α-ethylbutyronitrile) is isolated by filtration in 85% yield.

Examples 11-12

By substituting molecular equivalent amounts of the amino starting material shown below for the amino compound in Example 1, the corresponding N-dichloro-amino compound is obtained.

| Amine starting material: | N-dichloro-amino product |
|---|---|
| (11) 2-amino-2-methyl-propionitrile | N,N-dichloro-2-amino-2-methylpropionitrile. |
| (12) 4-amino-4-cyanopentanoic acid | N,N-dichloro-4-amino-4-cyanopentanoic acid. |

Examples 13-14

By substituting molecular equivalent amounts of the amino starting material shown below for the amino compound in Example 2, the corresponding N-dichloro-amino compound is obtained.

| Amine starting material: | N-dichloro-amino product |
|---|---|
| (13) 1-amino-1-cyano-cyclobutane | N,N-dichloro-1-amino-1-cyanocyclobutane. |
| (14) 2-amino-2-cyclopropyl-propionitrile | N,N-dichloro-2-amino-2-cyclopropyl-propionitrile. |

Examples 15-17

By substituting molecular equivalent amounts of the amino starting material shown below for the amino compound in Example 3, the corresponding N-dichloro-amino compound is obtained.

Amine starting material: N-dichloro-amino product
(15) 1-amino-1 - cyano-cyclobutane _____ N,N-dichloro - 1 - amino-1-cyanocyclobutane.
(16) Ethyl-4-amino - 4 - cyanopentanoate _____ Ethyl-N,N - dichloro - 4-amino-4 - cyanopentanoate.
(17) Methyl-4-amino - 4-cyanopentanoate _____ Methyl-N,N - dichloro-4-amino - 4 - cyanopentanoate.

*Example 18*

By substituting molecular equivalent amounts of 1-amino-4-ethyl-1-sodiocarboxylate-cyclohexane for the 2-methylcyclohexanone-aminonitrile of Example 4, the corresponding N,N-dichloro-1-amino-4 - ethyl - 1 - sodiocarboxylate-cyclohexanone is obtained.

*Examples 19–21*

By substituting molecular equivalent amounts of the amino starting material shown below for the amino compound in Example 5, the corresponding N-dichloro-amino compound is obtained.

Amine starting material: N-dichloro-amino product
(19) 2-amino-2-hexyl-octane-nitrile _____ N,N-dichloro-2 - amino-2-hexyloctanenitrile.
(20) Potassium - 2-amino - 2 - cyclo-hexylpropionate ____ Potassium-N,N - dichloro-2-amino-2-cyclohexylpropionate.
(21) 2 - amino - 2 - methyl-3 - phenylpropionitrile _____ N,N-dichloro - 2 -amino-2-methyl-3 - phenylpropionitrile.

*Examples 22–24*

By substituting molecular equivalent amounts of the N,N-dichloro starting materials shown below for the N,N-dichloro compound of Example 6, the corresponding symmetrical azo product is obtained.

N,N-dichloro starting material: Azo product
(22) N,N - dichloro-amino - 2 - hexyloc-tanenitrile _____ 2,2' - azo - bis(2 - hexyloctanenitrile).
(23) Ethyl - N,N - dichloro - 4 - amino-4-cyanopentanoate ____ 4,4' - azo - bis(ethyl - 4-cyanopentanoate).
(24) Methyl - N,N'-dichloro-4 - amino-4-cyanopentanoate __ 4,4' - azo - bis(methyl - 4-cyanopentanoate).

*Example 25*

By substituting a molecular equivalent amount of N,N-dichloro-1-amino-4-ethyl-1-sodiocarboxylate - cyclohexane for the N,N-dichlorodiethylketone - aminonitrile of Example 7, the corresponding 1,1'-azo-bis(4-ethyl-1-sodiocarboxylate-cyclohexane) is obtained.

*Examples 26–27*

By substituting molecular equivalent amounts of the N,N-dichloro starting materials shown below for the N,N-dichloro starting material of Example 8, the corresponding symmetrical azo product is obtained.

N,N-dichloro starting material Azo product
(26) N,N - dichloro-2-amino-2 - methyl-propionitrile _____ 2,2' - azo - bis(isobutyronitrile).
(27) N,N-dichloro - 2-amino - 2 - cyclopro-pionitrile _____ 2,2 - azo - bis(2 - cyclopropylpropionitrile).

*Examples 28–31*

By substituting molecular equivalent amounts of the N,N-dichloro starting materials shown below for the N,N-dichloro starting material of Example 9, the corresponding symmetrical azo product is obtained.

N,N-dichloro starting material: Azo product
(28) N,N-dichloro - 1-amino - 1 - cyano-cyclobutene _____ 1,1' - azo - dicyclobutane-carbonitrile.
(29) N,N - dichloro-1-amino - 1 - cyano-cyclododecane _____ 1,1' - azo-dicyclododecane-carbonitrile.
(30) N,N - dichloro-4 - amino- 4 -cyano-pentanoic acid _____ 4,4' - azo - bis(4 - cyanopentanoic acid).
(31) N,N - dichloro-2 - amino - 2 - methyl-3 - phenylpropionitrile _____ 2,2' - azo - bis(2 - methyl-3-phenylpropionitrile).

*Example 32*

By substituting a molecular equivalent amount of potassium-N,N-dichloro-2-amino - 2 - cyclohexylpropionate for the N,N-dichloro-2,4-dimethyl - 2 - amino - 4 - methoxy-valeronitrile of Example 10, the corresponding 2,2'-azo-bis(potassium-2-cyclohexylpropionate) is obtained. This material displays good utility as a polymerization initiator for olefins.

I claim:
A process for preparing symmetrical azo compounds of the following formula

(1) 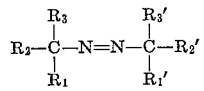

wherein $R_{1'}$ and $R_1$ are the same, $R_{2'}$ and $R_2$ are the same and $R_{3'}$ and $R_3$ are the same,
comprising coupling an N-dichloro-amino compound of the following formula (2) 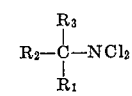

wherein $R_1$ is an alkyl of 1 to 6 carbon atoms; $R_2$ is an alkyl of 1 to 6 carbon atoms, or a cycloalkyl of 3 to 6 carbon atoms; and $R_3$ is —CN, —COOM, or —COOR
wherein M is an alkali metal or an alkaline earth metal and R is an alkyl of 1 to 6 carbon atoms; with the limitation that $R_1$ and $R_2$ together can be cycloalkyl of 5 to 12 carbon atoms and with the further limitation that $R_1$ and $R_2$ must total to more than 4 carbon atoms,
said coupling reaction being carried out in the presence of an inert organic solvent and a base which has an ionization constant greater than $1 \times 10^{-5}$ and which will not react with chlorine to form N-chloro compounds, at a temperature between the freezing point and boiling point of the reaction mass and separating the symmetrical azo product thus formed.

References Cited

UNITED STATES PATENTS 2,711,405   6/1955   Anderson _____ 260—192

OTHER REFERENCES

Jackson et al., J. Am. Chem. Soc., vol. 69, pp. 1539–40 (1947).

CHARLES B. PARKER, *Primary Examiner.*

FLOYD D. HIGEL, *Assistant Examiner.*